(12) United States Patent
Baker

(10) Patent No.: US 11,524,411 B2
(45) Date of Patent: Dec. 13, 2022

(54) AUTOMATED PRODUCT LOADING ONTO A PALLET

(71) Applicant: SoftWear Automation Inc., Cumming, GA (US)

(72) Inventor: Michael J. Baker, Acworth, GA (US)

(73) Assignee: SOFTWEAR AUTOMATION, INC., Cumming, GA (US)

( * ) Notice: Subject to any disclaimer, the term of this patent is extended or adjusted under 35 U.S.C. 154(b) by 0 days.

(21) Appl. No.: 17/588,490

(22) Filed: Jan. 31, 2022

(65) Prior Publication Data

US 2022/0241983 A1 Aug. 4, 2022

Related U.S. Application Data

(63) Continuation of application No. PCT/US2022/070427, filed on Jan. 29, 2022.

(60) Provisional application No. 63/143,226, filed on Jan. 29, 2021.

(51) Int. Cl.
*B25J 11/00* (2006.01)
*D06F 73/00* (2006.01)

(52) U.S. Cl.
CPC .............. *B25J 11/00* (2013.01); *D06F 73/00* (2013.01)

(58) Field of Classification Search
CPC .......... B25J 11/00; B25J 11/005; D06F 73/00; D05C 1/00; D05C 1/02; D05C 9/00; D05C 9/22
See application file for complete search history.

(56) References Cited

U.S. PATENT DOCUMENTS

| | | | |
|---|---|---|---|
| 5,218,915 A * | 6/1993 | Iwasaki | D05B 39/00 112/470.07 |
| 5,247,885 A | 9/1993 | Iaccino et al. | |
| 5,802,704 A * | 9/1998 | Woody | D05C 1/02 29/721 |
| 6,439,370 B1 | 8/2002 | Hoffman, Jr. et al. | |

(Continued)

FOREIGN PATENT DOCUMENTS

| | | |
|---|---|---|
| EP | 1147890 A1 | 10/2001 |
| WO | 2020039422 A1 | 2/2020 |
| WO | 2020227311 A1 | 11/2020 |

OTHER PUBLICATIONS

International Search Report for PCT/US2022/070427 dated May 23, 2022.

*Primary Examiner* — Ismael Izaguirre
(74) *Attorney, Agent, or Firm* — Thomas | Horstemeyer, LLP

(57) ABSTRACT

Various examples are provided related to automation of pallet loading. In one example, a method includes positioning, by a material manipulator, an opening of a product; inserting a product loading assembly of a pallet loading system through an opening of the product, where the product loading assembly can hold the product during manipulation of the product and the pallet loading system can position the product for loading on a pallet; and transferring the product onto the pallet using the product loading assembly. The product can be a portion of a product or a garment or portion of a garment. The product can be smoothed on a surface of the pallet. The pallet can secure the product to the pallet by a pallet clamp. The product on the pallet can be embellished by processing equipment or workstation.

20 Claims, 6 Drawing Sheets

(56) References Cited

U.S. PATENT DOCUMENTS

| | | | | |
|---|---|---|---|---|
| 6,832,569 | B2 * | 12/2004 | Krasnitz | D05B 39/00 101/127.1 |
| 7,080,602 | B2 * | 7/2006 | Kawaguchi | D05C 9/04 112/103 |
| 8,356,735 | B1 * | 1/2013 | Drakeford | A47G 25/905 223/112 |
| 2005/0155133 | A1 * | 7/2005 | Sato | A61B 42/00 221/45 |
| 2011/0167603 | A1 * | 7/2011 | Vesely | A61F 2/2427 29/221.6 |

* cited by examiner

AUTOMATED PRODUCT LOADING ONTO A PALLET

CROSS REFERENCE TO RELATED APPLICATIONS

This application claims priority to, and the benefit of, co-pending U.S. provisional application entitled "Automated Garment Loading onto a Pallet" having Ser. No. 63/143,226, filed Jan. 29, 2021, which is hereby incorporated by reference in its entirety. This application also claims priority to, and the benefit of, co-pending PCT application entitled "Automated Product Loading onto a Pallet" having Ser. No. PCT/US2022/070427, filed Jan. 29, 2022, which is hereby incorporated by reference in its entirety.

BACKGROUND

Garments are often embellished with a logo design or image. Pallets are garment holding mechanisms used in the application of embellishments to a garment. The garment is manually loaded onto the pallet for processing. Loading and unloading the garment precisely on and off the pallet for embellishment is a critical, time consuming, and repetitive process. Positioning, orientation, and alignment of a garment for embellishment can directly influence the quality output of the operation. Therefore, it is desirable for an automated solution to address these concerns.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

SUMMARY

Aspects of the present disclosure are related to product loading onto a pallet. Examples of methods and systems for the automatic loading of a sewn product such as, e.g., a garment (e.g., a t-shirt) onto a pallet are disclosed. The pallet supports the product to facilitate embellishment of the product. For example, the pallet can include a surface upon which a shirt (or other garment or product) is spread for printing, etc. and securing apparatus to hold the shirt in position on the surface. Embellishments can include, e.g., direct to garment printing (DTG), screen printing, heat transfer, or embroidery. Additional sewn products include other garments (e.g. pants), bags, and other products with closed or partially closed geometry.

In one aspect, among others, a method for automated product loading comprises positioning, by a material manipulator, an opening of a product; inserting a product loading assembly of a pallet loading system through the opening of the product, the product loading assembly configured to hold the product during manipulation of the product, the pallet loading system configured to position the product for loading on a pallet; and transferring the product onto the pallet using the product loading assembly. In one or more aspects, positioning the opening can comprise lifting, by the material manipulator, an edge of the opening of the product for the insertion of the product loading assembly. The material manipulator can be configured to separate and grip an end of the opening of the product. Air dispensed by the material manipulator can separate the edge of the opening for gripping by mechanical fingers.

In various aspects, the product loading assembly can engage with an inner surface of the product to hold the product during manipulation. The product loading assembly can comprise support arms that are inserted through the opening and expand to engage with the inner surface of the product. The method can comprise transporting the product with the pallet loading system to a pallet loading location for transfer of the product to the pallet. Orientation of the product can be controlled by the pallet loading system for transfer to the pallet. The product loading assembly can acquire the product in a first orientation and can be repositioned to a second orientation by the pallet loading system at the pallet loading location.

In some aspects, transferring the product onto the pallet can comprise relative motion between the product loading assembly and a pallet base to insert the pallet base of the pallet through the opening of the product. Transferring the product onto the pallet can comprise advancing the pallet base through the opening of the product. Position of the product on the pallet base can be adjusted by the product loading assembly. The position of the product can be adjusted by support rods of the product loading assembly.

In one or more aspects, the method can comprise smoothing the product on the pallet. The product can be smoothed during removal of the product loading assembly from the product. The product can be smoothed on the pallet by support arms of the product loading assembly. The product can be smoothed on the pallet after removal of the product loading assembly from the product. The product can be smoothed on the pallet by mechanical smoothing device. The method can comprise securing the product on the pallet. The product can be secured on a raised surface of the pallet by a pallet clamp.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
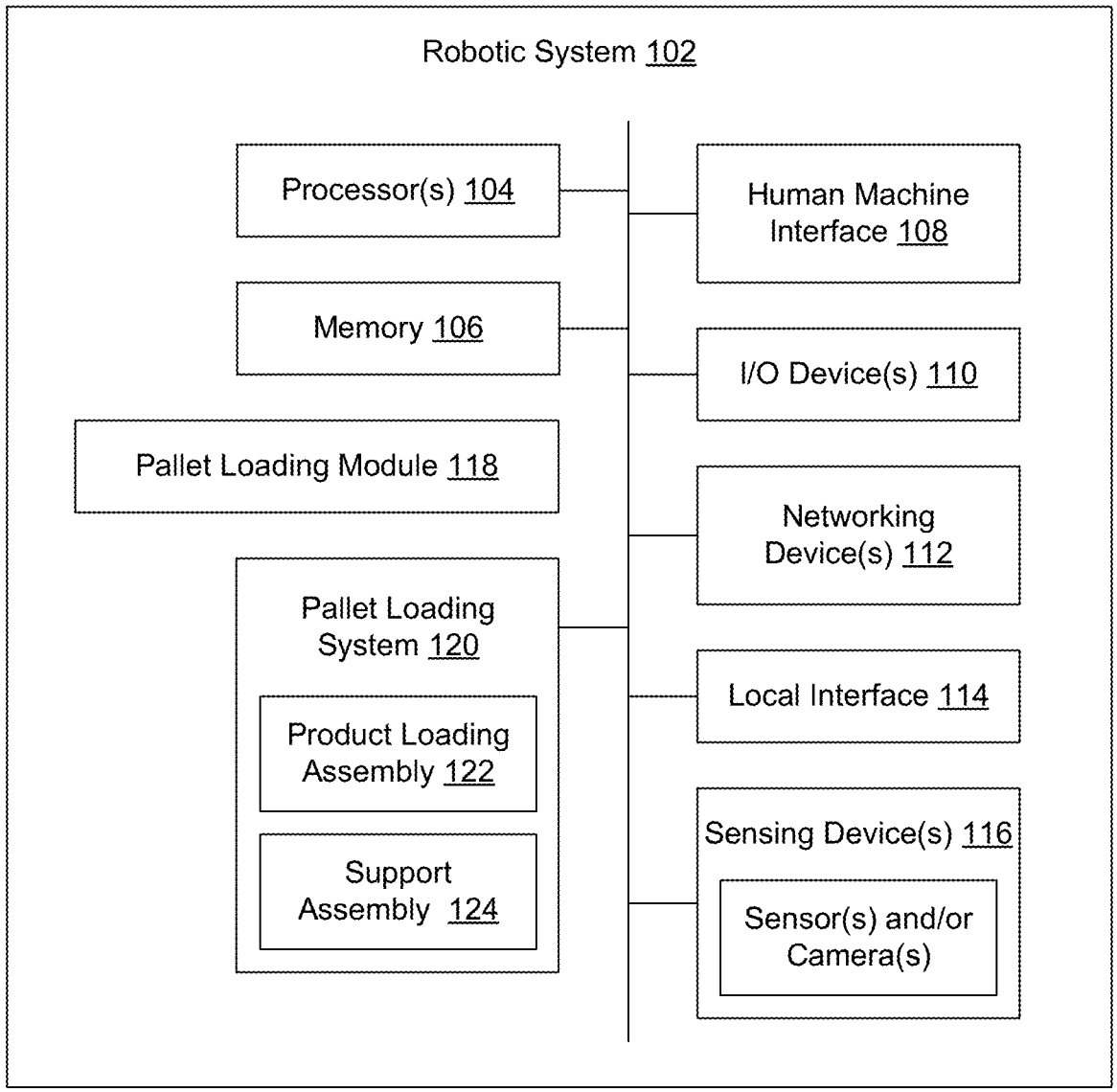
FIG. 1 illustrates an example of a system for pallet loading, according to various embodiments of the present disclosure.
Figure 1:
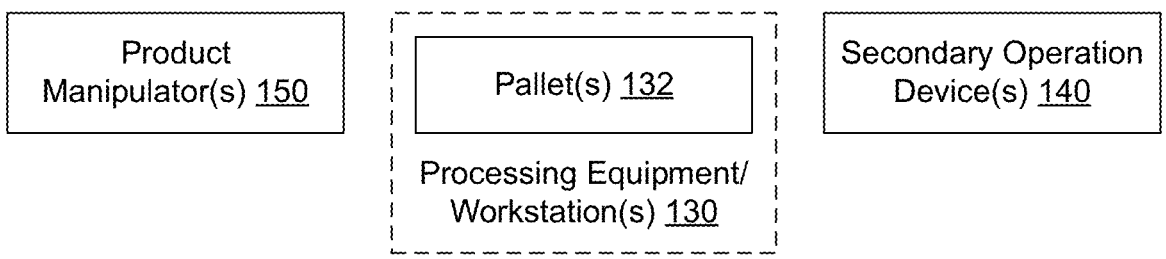

Disclosed herein are various examples related to automation of pallet loading using robots. Reference will now be made in detail to the description of the embodiments as illustrated in the drawings. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Referring to FIG. 1, shown is an example of a system that can be used for loading and/or unloading, e.g., garments or other products for embellishment or other processing such as, e.g., printing, heat transfer, embroidery, etc. While this disclosure presents the assemblies, systems, and methods in the context of garments, the disclosure is equally applicable to other types of manufactured products. Products can include garments (e.g., shirts, pants, dresses, skirts, etc.) or other items manufactured from material. These products can include, but are not limited to, pillowcases, covers, bags, or other products with a closed or partially closed geometry. In the context of this disclosure, a product refers to a product or portions of a product such as, e.g., a garment or portions of garments being processed by the system to produce a finished product. For example, the system can be used to load a garment or portion of a garment onto a pallet for embellishment during the production process or unloading the garment or portion of the garment after the embellishment after the equipment or workstation is complete or stopped. The system can also be used to transport the product or garment or portion of the product or garment between different pieces of processing equipment or workstations, conveying system and/or storage systems.

As illustrated in the example of FIG. 1, the system can comprise a robotic system 102, which can include a processor 104, memory 106, an interface such as, e.g., a human machine interface (HMI) 108, I/O device(s) 110, networking device(s) 112, and a local interface 114, and sensing device(s) 116. The sensing device(s) 116 can comprise a sensor or camera such as, e.g., an RGB camera, an RGB-D camera, a near infrared (NIR) camera, stereoscopic camera, photometric stereo camera (single camera with multiple illumination options), etc. Additionally, the robotic system 102 can include a pallet loading system 120, which may be utilized in the processing of the garments or other products. The pallet loading system 120 can include a product loading assembly 122 configured to hold the product or garment and a support assembly 124 configured to support and position the pallet loading assembly 122.

The robotic system 102 can transport, position and/or manipulate, e.g., a garment or portion of a garment with respect to a pallet 132 of processing equipment or a workstation 130. A workstation 130 performs an operation on a product or garment. Examples of processing equipment and workstations 130 include, but are not limited to, embellishing devices such as, e.g., direct to garment printers, screen printers, heat transfer devices, embroidery machines, etc. The pallet loading system 120 can receive, e.g., a product or garment and position it for loading on a pallet 132 of the processing equipment or workstation 130 for embellishment or other processing. Positioning of the product or garment on the pallet 132 can be automated and controlled by the pallet loading module 122. When the processing (e.g., printing, pressing, sewing, etc.) is complete, the processed product or garment can be removed from the pallet 132 by the same or a different pallet loading system 120. The pallet loading system 120 can also transport a garment or product to/from a storage system that can automatically stow or retrieve the garment or product, or to/from another conveyance system configured for transport of the garment or product. The storage or conveyance systems can include secondary operation device(s) 140 such as, e.g., hanging, stacking or destacking device(s), folding or unfolding device(s), and/or other product manipulation device(s) that can facilitate storage, retrieval or transport of the garment or product. The product or garment can be manually loaded on and/or removed from the pallet loading system 120. In more fully automated processes, product manipulator(s) 150 can be used to autonomously install and/or remove the product or garment on the pallet loading system 120. With the garment secured by the product loading assembly 122, the pallet loading system 120 can position, orient, and/or align the product or garment on the pallet 132 for processing operations at processing equipment or workstations 130. The pallet loading system 120 can also provide the product or garment to a secondary operation device such as, e.g., hanging, folding, and/or stacking equipment for storage or a conveyance system for transport.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a graphical user interface (GUI), a human machine interface (HMI), a voice interface, or a web-based user-interface.

The input/output devices or I/O devices 110 of the robotic system 102 can comprise components used to facilitate connections of the processor 104 to other devices such as, e.g., product manipulator(s) 150, processing equipment or workstation(s) 130 such as, e.g., an embellishing device, secondary operation device(s) 140, sensing device(s) 116, pallet loading system 120, or other equipment and can, for instance, comprise one or more serial, parallel, small system interface (SCSI), universal serial bus (USB), IEEE 1394 (i.e., Firewire™), or other appropriate connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The local interface 114 of the robotic system 102 can be, for example, but not limited to, one or more buses or other wired or wireless connections, as is known in the art. The local interface 114 can have additional elements, which are omitted for simplicity, such as controllers, buffers (caches), drivers, repeaters, and receivers, to enable communications. Further, the local interface 114 can include address, control, and/or data connections to enable appropriate communications among the components.

The sensing device(s) 116 of the robotic system 102 can facilitate detecting the movement and position of the material(s) and/or inspecting the material(s) for defects and/or discrepancies during a handling and/or processing operation. A sensing device 116 can comprise sensor(s) and/or camera(s) such as, but is not limited to, an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc.

The pallet loading module 118, when executed by the processor 104, can control the robotic system to implement handling, transport and/or positioning of a garment or portion of a garment. The pallet loading system 120 can manipulate the garment (e.g., a shirt) for loading onto a pallet 132 of the processing equipment or workstation 130, unloading the processed garment from the pallet 132 of the processing equipment or workstation 130.

During operation, the pallet loading system 120 can interact with one or more processing equipment or workstation(s) 130 and/or with secondary operation device(s) 140, in addition to product manipulator(s) 150. The pallet loading system 120 can transport, position and/or manipulate, e.g., a garment or portion of a garment with respect to a pallet 132 of the processing equipment or a workstation 130 or other secondary operation device 140. The processing equipment or workstation(s) 130 can comprise an embellishing device such as, e.g., a direct to garment printer, screen printer, heat transfer device, embroidery machine, etc. The secondary operation device(s) 140 can include, e.g., stacking device(s), folding device(s), label manipulation device(s), and/or other storage or conveying device(s) that assist with the preparation, installation, removal and/or finishing of the product or garment.

Figure 2:
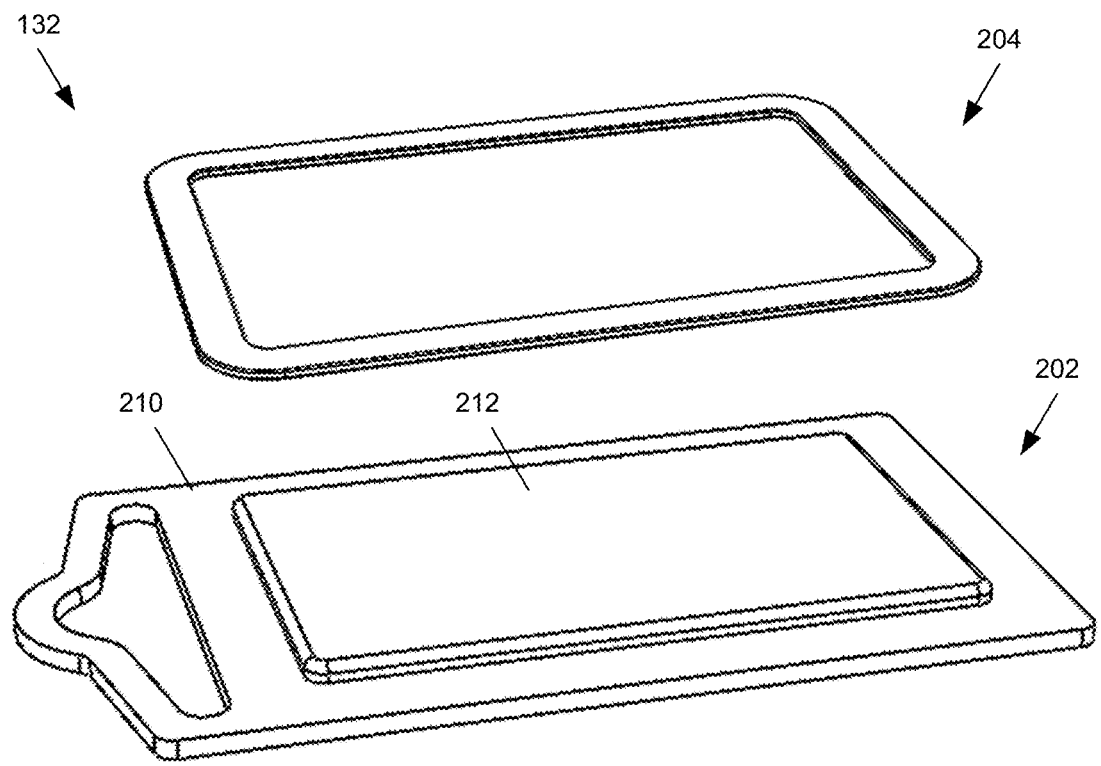
FIG. 2 illustrates an example of a pallet of a processing equipment or workstation, according to various embodiments of the present disclosure.

For example, a workstation 130 can comprise a pallet 132 to facilitate embellishing (e.g., printing or sewing) the portions of a product or garment. FIG. 2 illustrates an example of a pallet 132 including, e.g., a pallet base 202 and, optionally, a pallet clamp 204. In the example of FIG. 2, the pallet base 202 includes a frame 210 sized to support the garment or portion of a garment. The frame 210 can be shaped to align with a portion of the garment such as, e.g., the shoulders and collar opening of a shirt. The frame 210 can also include a raised surface 212 upon which a portion of the garment is spread for embellishment by, e.g., printing.

The pallet clamp 204 can be configured to secure the portion of the garment in position over the surface 212. For example, the pallet clamp 204 can be lowered onto the pallet base 202, pressing down on the garment over the raised surface 212, stretching the garment material in preparation for embellishment and securing the orientation and alignment of the garment on the pallet base 202. In some implementations, the pallet clamp 204 can press on the surface 212 to hold the garment material in position. In some embodiments, the pallet clamp 204 can be separate from the pallet base 202 and lowered onto the pallet base 202 around the raised surface. In other embodiments, the pallet clamp 204 may be attached to the pallet base 202 such as, e.g., by a hinged connection or other articulated connection. For example, the pallet clamp 204 can be configured to pivot down onto the pallet base 202 around the raised surface 212.

In some embodiments, the pallet base 202 can include features to secure the product or garment material without the need to clamp the product or garment material from the top. For example, the pallet base 202 may include regions along two or more sides of the pallet 132 where material can be tucked in to secure the product or garment. The tucked in material can be held in place with, for example, strips of rubber or foam or by an actuated clamping action. In other embodiments, the surface 212 of the pallet base 202 upon which the product or garment material is positioned may include features to secure that portion of the product or garment material. For example, the surface 212 can include opening where a vacuum can be used to hold the material down. In another example, the surface 212 can use electro-adhesion to hold the material down. In yet another example, a tacky or high friction material can be used to secure the material. In a final example, the motion of the pallet 132 or pallet base 202 may be restricted such that no additional securing means are required after the product or garment is laid out and smoothed onto the surface.

In the above embodiments and examples of the pallet 132, the product or garment may be laid such that the area of the product or garment to be embellished lies directly on the surface 212 of the pallet 132 with the remainder of the product or garment wrapping around or partially around the pallet base 202, or the product or garment may be laid such that an upper and a lower layer of fabric or material lay on the surface 212 of the pallet 132 with the remainder of the product or garment laying on or laying over the edge of the remainder of the pallet base 202.

Functioning of a pallet loading system 120 will now be discussed with reference to the example of FIG. 3A. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
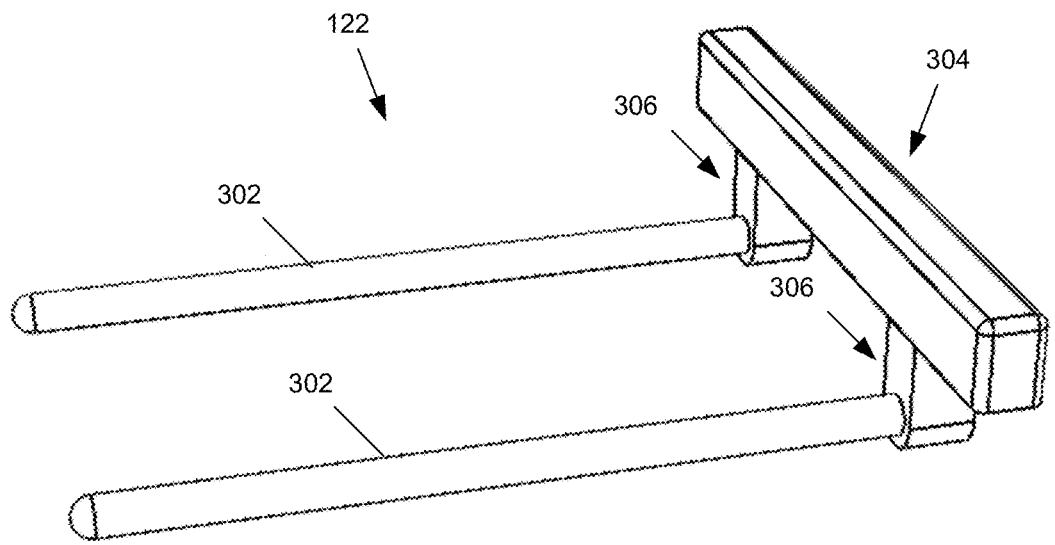
FIG. 3A illustrates an example of a product loading assembly of a pallet loading system and FIG. 3B illustrates an example of a material manipulator, according to various embodiments of the present disclosure.

FIG. 3A illustrates an example of a product loading assembly 122 of the pallet loading system 120, which can be coupled to a support assembly 124. The pallet loading system 120 can facilitate loading and/or unloading of a garment or portion of a garment onto and/or from a pallet 132 of a workstation or processing equipment 130. The product loading assembly 122 comprises a plurality of support arms or rods 302 configured to hold a garment (e.g., a shirt or portion of thereof) or other product in position for loading and/or unloading of the garment. In the example of FIG. 3A, two substantially parallel support arms or rods 302 are shown, but other combinations and/or orientations of support arms or rods can be used. For example, the product loading assembly 122 can include two or more support arms or rods 302 to facilitate opening the garment for positioning around the pallet base 202 of the pallet 132. The support arms or rods 302 can be hollow or solid rods having a circular or geometric cross-section (e.g., D-shaped, C-shaped, triangular, rectangular or square, hexagonal, octagonal, etc.), flat, curved, contoured or angled plates, or other appropriate support or support configuration.

In various embodiments, support arms or rods 302 can be supported by a positioning assembly 304, which is configured to control the positioning of the support arms or rods 302 along one or more translational axes. The support arms or rods 302 supporting the garment can be repositioned by the positioning assembly 304 to align with the pallet base 202 of the pallet 132 of the workstation or processing equipment 130 to facilitate loading of the garment for processing or unloading after processing. For example, the spacing, width or radius of the support arms or rods 302 can be adjusted (either individually or in combination) to adjust the aspect ratio (length vs. width) of the product loading assembly 122.

The support arms or rods 302 can also include rollers at one or more locations along the length of the support arm or rod. The rollers can comprise a surface that grips or engages with the garment material that is supported across the support arms or rods 302. The rollers can encircle the support arm or rod 302 or can mounted in the support arm or rod 302 and extend through a portion of the surface of the support arm or rod 302 to engage the garment material. The rollers can be rotated (in opposite directions) to tension or stretch the garment material that is supported across the support arms or rods 302 or can be rotated to adjust the position, orientation and/or alignment of the garment material over the pallet base 202. The rotation of the rollers can be coordinated to achieve the desired placement of the garment on the surface 212 of the pallet 132 for embellishment or other operations. The support arms or rods 302 may also be configured to allow for their length to be adjusted or controlled (either individually or in combination), which would also affect the aspect ratio.

In some implementations, the support arms or rods 302 can be designed to adjust its curvature (e.g., an articulated or segmented along its length) or can include one or more mechanisms located along the length of the support arm or rod 302 that can expand or retract to change its contours. For example, one or more bladder incorporated in the support arm or rod 302 can be inflated or deflated to increase or decrease the diameter to control the contact area. Other mechanisms such as, e.g., wings or partial sleeves that fold against the support arm or rod 302 can be pivoted outward away from the support arm or rod 302 to increase the engagement with the garment or product and pivoted back to reduce the contact and profile of the support rod or arm 302. For example, the wings or partial sleeves can pivot away from the support arm or rod 302 to increase the separation between opposite sides of the garment to allow the pallet base 202 of the pallet 132 to be more easily positioned within the garment. The support arms or rods 302 can also include one or more sensors at the same or different locations to monitor the positioning of the support arm or rod 302 with respect to the garment or product and/or the pallet 132 (or pallet base 202) of the processing equipment or workstation 130 or secondary operation device 140. The sensor(s) can be used to align the support arms or rods 302 with the pallet base 202 of the pallet 132 of the workstation 130 for loading or unloading of the garment or to detect the garment on either the support arms or rods 302 or the pallet 132.

In some embodiments, the configuration and geometry of the support arms or rods 302 can be controlled or adjusted for engagement and shaping of the supported garment or product. The length of the support arms or rods 302 can be controlled using a variety of methods. In some embodiments, the support arms or rods 302 can be extended using pneumatic or electrical drive mechanisms such as, e.g., drive screws or cables that can be driven using electrical or pneumatic actuators or plastic sheathing that can be inflated to extend the support arm or rod 302. Such arrangements can control or limit the amount of force being applied to the garment or product as the support arm or rod 302 is being extended. Shape and contours of the support arms or rods 302 can also be changed or adjusted or controlled. The support arm or rod 302 can also include orifices along its length to provide suction with a vacuum to improve the grip of the support arm or rod 302 on the supported garment or product. In some embodiments, the support arms or rods 302 can be configured to rotate about their longitudinal axis. For example, the support arms or rods can be rotated while applying a vacuum to tension or stretch the garment material being gripped.

The product loading assembly 122 can comprise a plurality of support arms 302 (e.g., two, three, four, or more) that extend outward from (e.g., substantially perpendicular to) the positioning assembly 304. The positioning assembly 304 can comprise pneumatically or electrically driven actuators configured to adjust positions of the support arms or rods 302 for alignment of the supported product or garment with a pallet base 202 of the workstation or processing equipment 130. For example, the support arms or rods 302 can be symmetrically distributed about the positioning assembly 304 (e.g., two support arms or rods about 180 degrees apart, three support arms or rods about 120 degrees apart, four support arms or rods about 90 degrees apart, etc.) or can be asymmetrically distributed. The number and arrangement of the support arms or rods 302 can be designed for a specific product or garment and a pallet 132 of a workstation or processing equipment 130. Actuators can comprise, e.g., pneumatic or electric motors (e.g., stepper, permanent magnet, etc.), pistons, or other controlled actuation devices.

In the example of FIG. 3A, the positioning assembly 304 is an open-sided structure (e.g., an inverted U-shaped structure) that can expand and contract along a translational axis. The positioning assembly 304 can comprise a cross-drive apparatus attached to offset supports 306 coupled to the support arms or rods 302. In some embodiments, the offset supports 306 can comprise arm drive apparatus aligned orthogonal to the cross-drive apparatus of positioning assembly 304. For example, the cross-drive apparatus can include pneumatically or electrically driven actuators that can turn a drive screw to move offset supports 306 and support arms or rods 302 in opposite directions. In some embodiments, positioning of the support arms or rods 302 can be independently controlled (e.g., using separate actuators). In other implementations, a first support arm or rod 302 can be mounted in a fixed location on the positioning assembly 304 and a second support arm or rod 302 can be movable across the positioning assembly 304. The support arms or rods 302 can be coupled to the offset supports 306 at a proximal end or can be affixed at another location on the support arm or rod 302. In some embodiments, a support arm or rod 302 can extend through the offset support 306. For instance, a pneumatic or electric actuator can be used to control the length of the support arm or rod 302 extending outward from the offset support 306.

Other arrangements of the positioning assembly 304 can also be utilized. For example, screw-driven scissor mechanisms can be used to support and reposition the support arms or rods 302. The product loading assembly 122 can also be configured to control the support arms or rods 302 using non-Cartesian movement. For example, the support arms or rods 302 can be repositioned radially about a center point or otherwise controlled by the positioning assembly 304. Other implementations can control movement of the support arms or rods 302 using a combination of linear and rotational movement. Other forms of movement or motion control can also be utilized.

The shape and geometry of the positioning assembly 304 can facilitate maneuvering and positioning of the product loading assembly 122 with respect to the pallet 132 of processing equipment and workstations 130. The opening on the side of the open sided (U-shaped) structure can allow the product loading assembly 122 to pass over and/or around of the structure of, e.g., the pallet 132 of a workstation 130 for alignment of the supported garment or product for processing. For example, the open geometry in the support structure allows for the support arms or rods 302 to slide around pallet bases, material holders or guides of the workstation 130, allowing for transfer of the garment for processing. In addition, the range of motion of the system may need additional flexibility to adjust to different pallets 132 of the workstation 130.

The support arms or rods 302 can be contracted together using the positioning assembly 304 for insertion through an opening (or multiple openings) in, e.g., a garment or portion of a garment. Once inserted, the positioning assembly 304 can expand the support arms or rods 302 to engage with the inner surface of the material. The positioning of the support arms or rods 302 can be adjusted to tension the garment or portion of the garment to provide a reliable hold and/or to hold it in a specific shape. The shape or contour of the support arms or rods 302 can also be changed or modified to adjust the shape of the garment or portion of the garment for alignment with a pallet base 202 of the workstation 130 to ensure positive control for the processing operation.

To improve or increase the surface contact with the material, the support arms or rods 302 can include contact control tips at a distal end. The contact control tips can be adjusted to assist with the insertion of the support arm or rod 302 through an opening in the garment or other product and then reconfigured to improve contact with the material for holding the garment or other product in position and/or to prevent the support arm or rod 302 from protruding from an opposite side of the garment or other product. The contact control tips can be stationary or repositioned to facilitate insertion and/or engagement of the support arms or rods 302 into and/or with the garment.

In some implementations, the support arm or rod 302 can be rotated about its longitudinal axis to allow the contact control tips to be pivoted in different directions. For example, pneumatically or electrically driven actuator(s) can rotate the support arms or rods 302, either individually or in combination, about their longitudinal axes. In other embodiments, the contact control tips can be configured to rotate about the longitudinal axis.

The shape and/or texture of the contact control tips can be designed to control or limit the force applied to the garment during insertion. In addition, the contact control tips can include one or more sensors that can determine the amount of force being applied or the position with respect to the garment for proper engagement or positioning with respect to the pallet 132 of the processing equipment or workstation 130 for transfer of control of the garment for processing. In various embodiments, the contact control tips will only act as a sensing platform for the sensors. The sensor(s) can be used to align the support arms or rods 302 with the pallet base 202 of the workstation 130 for loading or unloading of the garment or to detect the garment on either the support arms or rods 302 or the pallet 132. The contact control tip can be pivoted about a pivot point using mechanical controls such as, e.g., one or more linkage, threaded rod, cable, pneumatic pistons, etc. that extend through the shaft of the support arm or rod 302. By pivoting the contact control tip, it is possible to improve or maximize the engagement with the inner surface of the material.

Other types of contact control tips can also be used. For example, the contact control tip can include two or more folding surfaces or wings that can be rotated to fold together providing a uniform tip as the support arm or rod is inserted into the garment or other product and rotated outward away from each other to provide an expanded contact surface for engagement with the material. In other implementations, the contact control tip can be segmented allowing for articulated motion similar to a finger or can comprise a hoop that can be extended or expanded to engage with the material or a bladder that can be inflated to increase engagement with the material. The contact control tip can also include gripping devices that utilize, e.g., air flow, vacuum, mechanical gripping, such as a clamp, pinching, pins, or needles, electro-adhesion, adhesion, electro-static forces, freezing, brush, or hook and loop to better hold the material on the support arms or rods 302. In some cases, the support arms or rods 302 can use these techniques to improve gripping along the length of the support arm or rod. For example, one or more suction holes can be located along the support arm or rod 302 to draw the material against the surface when a vacuum is applied. Orifices along the length of the support arm or rod 302 can direct air flow against the material to facilitate insertion or removal of the support arms or rods 302 into or from the garment or other product.

In other embodiments, the product loading assembly 122 can be configured to grip an outer surface of the garment or other product for loading and/or unloading. For example, the support arms or rods 302 can be configured to grip the outer surface of the material. External handling devices can be included on or incorporated in the support arms or rods 302 to maintain a grip using, e.g., air flow, vacuum, or mechanical gripping, such as a clamp, pinching, pins, or needles, electro-adhesion, adhesion, electro-static forces, freezing, brush, hook and loop, etc. Once gripped, the garment or other product can be tensioned, positioned, oriented, or the shape of the garment or product can be adjusted or modified for loading onto or unloading from the pallet 132 of the equipment or workstation 130. For example, the support arms or rods 302 can be expanded away of each other to engage with an inner surface of the garment or other product to place it under tension. The support arms or rods 302 can then be repositioned (either individually or in combination) to change the shape of the garment or other product for loading onto or unloading from a a pallet base 202. The support arms or rods 302 can be repositioned based upon the garment or other product and the pallet 132 of the workstation as needed.

The product loading assembly 122 can be coupled to a support assembly 124 such as, e.g., a carriage or other appropriate support device (e.g., an industrial robot such as, but not limited to, 6-axis robots, articulated robots, selective compliance assembly robots (SCARA), or delta robots, etc.). The product loading assembly 122 can be coupled to the support assembly 124 or other support device in a fixed orientation or can connected through a joint that allows for rotation or translation of the product loading assembly 122. For example, the product loading assembly 122 can be supported through a rotational joint or a horizontal and/or vertical translation joint attached to the positioning assembly 304. In other implementations, the product loading assembly 122 can be coupled through a combination of a rotational joint and horizontal and vertical translation joints. Stacking of these joints in this order enables the product loading assembly 122 to be precisely positioned and oriented relative to the pallet 132 of the processing equipment or workstation 130. The support assembly 124 can comprise an XYZ cartesian motion system (e.g., cartesian coordinate robots, gantry robots or x-y-z robots) or articulated arms that can facilitate a wide range of motion for positioning the product loading assembly 122. For example, the product loading assembly 122 can be positioned by an industrial robot such as, e.g., 6-axis robots, articulated robots, selective compliance assembly robots (SCARA), or delta robots.

Feedback for control of the pallet loading system 120 can be provided by sensor device(s) 116, which can be distributed about the work area. Sensor feedback can be used to control the loading or unloading of the product on the product loading assembly 122, the loading or unloading of the product onto or from the pallet 132 of the processing equipment or workstation 130. For example, laser height sensors can be used to determine the relative position of the product loading assembly 122 relative to the pallet base 202 of the processing equipment or workstation 130. The sensor device(s) 116 can include, e.g., capacitive displacement sensors, eddy current sensors, Hall effect sensors, inductive sensors, laser doppler vibrometers, linear variable differential transformers, photodiode arrays, position encoders, potentiometer, optimal proximity sensors, ultrasonic sensors, or other types of monitoring sensors.

Functioning of the pallet loading system 120 and the product loading module 118 of the robotic system 102 will now be explained with reference to FIGS. 4A-4F. While this process is described as if applied to a t-shirt, it is equally applicable to other garments or products. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For the following example, consider a garment such as, e.g., a shirt 402 or other product. The shirt 402 can be either fully or partially constructed and can be lying flat on a surface or in a stack. The starting point could be later in the process, or with the shirt 402 in a different state such as, e.g., with the bottom opened up or separated or the entire shirt inverted (which may necessitate additional handling to bring the shirt to a ready state).

Figure 3B:
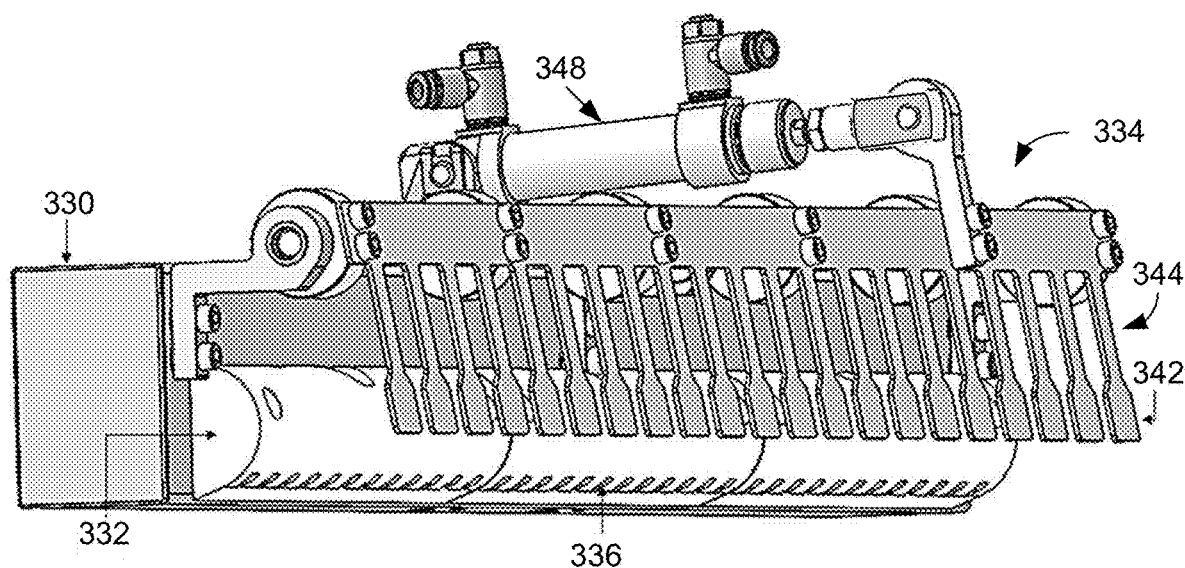

Initially, the bottom of the shirt 402 is opened. The front and the back panels of the shirt 402 need to be separated. This can be accomplished several ways, including with pneumatics such as, e.g., air or gas flow material movers, straight vacuum such as vacuum grippers, or mechanical means such as pinch grippers, needle grippers, etc. For example, material manipulator or moving apparatus such as those described in U.S. patent application Ser. No. 16/889,278 (issuing as U.S. Pat. No. 10,906,755), which is hereby incorporated by reference in its entirety, can be used to separate and grasp single layers of material to open the shirt or other product. FIG. 3B illustrates an example of the material manipulator or moving apparatus comprising an actuator bar 330, air material movers 332 and a material gripper 334. The air material movers 332 are attached to the actuator bar 330 and contain one or more air chambers with orifices 336 that exit an outer surface at a low angle, for example, in a range from 0 degrees to about 30 degrees. When the air material mover 332 contacts a top layer of a material stack, the air supply can be activated which initiates the airflow to travel to air input(s) and through an air chamber to the surface orifices 336. The air from the orifices 336 allow the top layer of the stacked material to be manipulated in a manner that results in the material fluttering or moving in a manner that facilitates gripping by the material gripper 334. The air supply may be compressed air provided to the one or more air chambers, where the compressed air can be channeled to outlets 336 which direct the air parallel to (or substantially parallel to) a surface. The curved shape of the air material mover 332 allows for the discharged air to travel along the curvature of the air material mover 332 which creates a localized vacuum that lifts the uppermost piece of material toward the outer surface of the air material mover 332, allowing the material to be captured by the material gripper 334. The material gripper 134 can secure a piece of material (e.g., against the outer surface of the air material mover 132) in order to move the piece of material into a workspace. The material gripper 334 can comprise a clamping mechanism that is attached to the actuator bar 330. For example, the clamping mechanism can include gripping or clamping elements having clamping pads 342 at the end of fingers 344 (e.g. structural members) that extend from a mounting bar pivotally mounted to the actuator bar 330. An activation device such as, e.g., a piston 348 (or other linear or rotary actuator) can be activated to extend a piston rod coupled to the clamping mechanism through mechanical linkage, causing the clamping pads 342 to pivot towards the air material mover 332 to grip a piece of product material after the air material mover 332 is activated. Once activated, the clamp moves towards the outer surface of the air material mover 332 until it clamps the top layer of the stack materials between the air material movers 332 and the clamping pads 342 of the material gripper 334. In some embodiments, the material gripper 334 may be a pinching gripper, electro-adhesive gripper, or needle gripper, or other appropriate gripping or clamping device. With the shirt 402 lying flat, one side of the bottom opening can be gripped and lifted to separate opposite sides of the bottom opening. For example, a material manipulator such as, e.g., a pneumatic material mover can use air flowing over the material to separate the top layer allowing it to be grasped by mechanical fingers. In other embodiments, the vacuum suction or mechanical grippers can be controlled to grip and separate the top layer. The top layer of material can be gripped (e.g., by engaging an inner surface of the product material) and manipulated to shape the bottom opening of the shirt 402 in a desired fashion. For example, the material can be gripped at defiled locations to control the width and/or shape of the bottom opening for insertion of a product holder. For example, with the bottom layer laying on the surface or stack, the top layer can be lifted to form a substantially rectangular opening with a width and height that facilitates insertion of the product loading assembly 122. In some embodiments, the gripping points of the top layer of material can be separated to stretch the material to prevent or reduce sagging of the top of the separate opening.

Figure 3C:
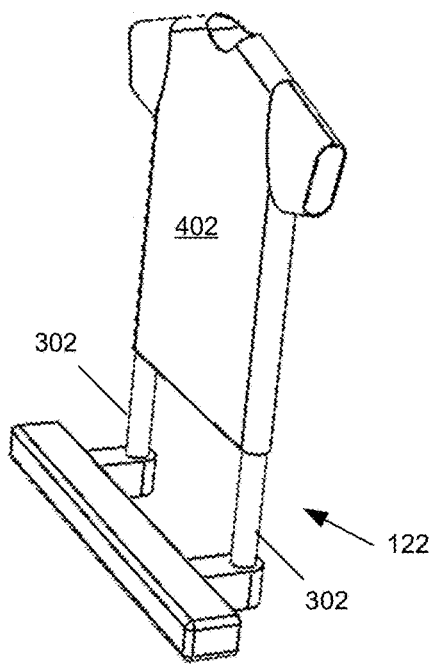
FIGS. 3C and 4A-4F illustrate an example of operation of the pallet loading system, according to various embodiments of the present disclosure.
Figure 4A:
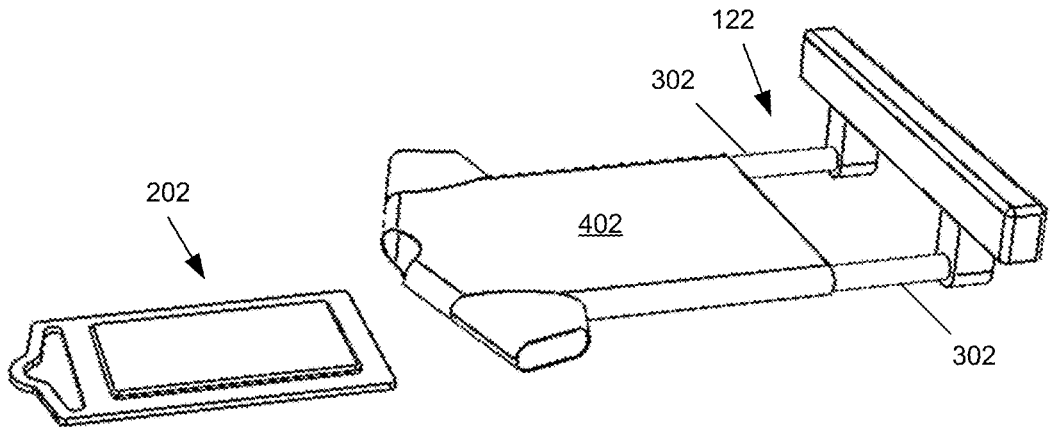

The product loading assembly 122 is inserted into the shirt 402 as illustrated in the example of FIG. 4A. The product loading assembly 122 can be configured to retrieve the shirt 402 from the stack or previous operation (e.g., after separating the bottom opening), to transport the shirt 402 to the pallet 132, and/or load the shirt 402 onto the pallet base 202. The product loading assembly 122 can acquire the shirt 402 in a first orientation (e.g., as shown in FIG. 3C) and can reposition the shirt 402 to a second orientation by the pallet loading system (e.g., as shown in FIG. 4A).

The pallet loading system 120 can include a multi-prong device (e.g., product loading assembly 122 of FIG. 3A) comprising, e.g., 2, 3, 4 or more prongs (e.g., support arms or rods 302) that can be inserted though the bottom opening of the shirt 402 and manipulated to engage with the inner surface, a device that can hold the shirt 402 from the outside (e.g., by pinching key areas), an expandable "body", a non-expandable "body", a flat plate shaped for the garment, etc. The shape and movement of the product loading assembly 122 can directly impact the complexity of the handoff between the product loading assembly 122 and the pallet 132. The prongs or support arms or rods 302 can include a variety of shapes or ends, active elements or components, or other features that can facilitate insertion and shaping of the opening or garment. The product loading assembly 122 can be adjustable to allow for adjustment between various positions or orientations to facilitate transport and loading of the garment or product. For example, a four-prong device can be inserted through the bottom opening and the prongs expanded to support the shirt in a first shape. The position of the prongs or support arms or rods 302 can be adjusted later to facilitate loading on the pallet base 202.

Figure 4B:
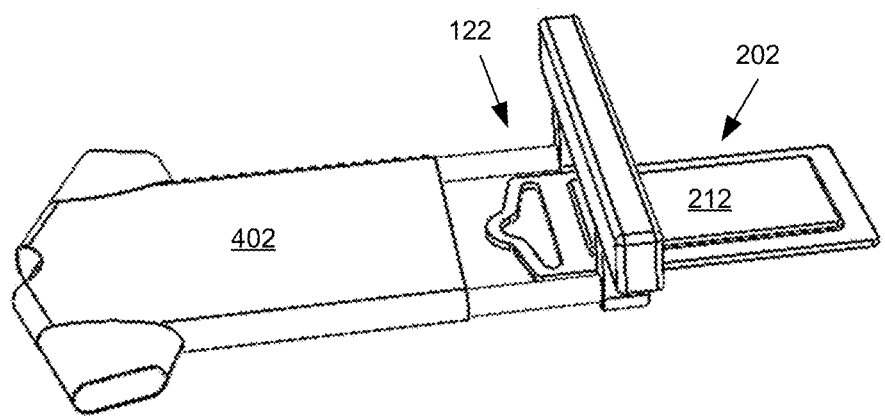

Depending on the processing layout, transport distance of the shirt 402 to the pallet 132 of the workstation 130 may be significant (e.g., 100 ft) or not needed. The transport path can be linear or serpentine depending on the processing environment. As illustrated in FIG. 4B, the target position at the end of transport is with the garment or product in the correct orientation to be loaded onto the pallet base 202. For example, the shirt 402 or other product should be positioned with the opening near the pallet base 202 at the end of the transport cycle. To place the shirt 402 in the proper orientation, the product loading assembly 122 can be rotated or otherwise manipulated prior to movement, during movement, at the end of movement, or a combination thereof. For example, the pallet loading system 120 can be controlled to acquire the shirt 402 in a first orientation for transport to the pallet 132 and then reposition the shirt 402 at the pallet 132 for loading onto the pallet base 202.

Figure 4C:
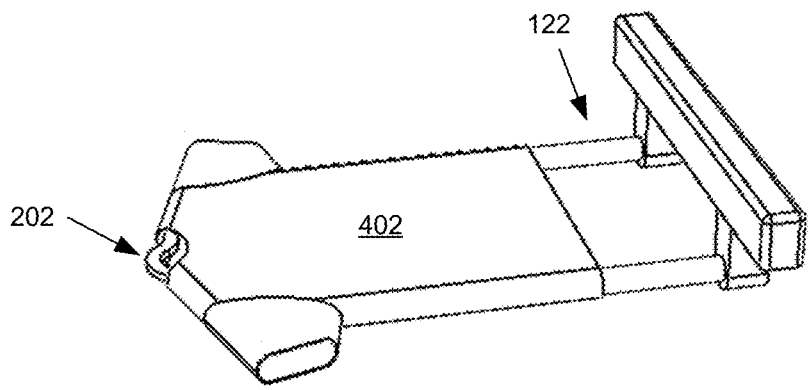

The shirt 402 can then be transferred or loaded onto the pallet base 202 as illustrated in FIG. 4C. The exact process is dependent on the specific garment or product and the product loading assembly 122 being used. The pallet loading system 120 can load the shirt 402 onto the pallet base 202 or can transfer the shirt 402 to a separate loading apparatus for positioning on the pallet base 202. The pallet base 202 can be advanced to align at least a portion of the frame 210 with a portion of the shirt 402 (e.g., the shoulders and neck opening) as shown in FIG. 4C. Alternatively, the pallet base 202 can be aligned under a specific portion of the shirt (e.g., the upper left chest area) depending on the area of the garment that is to be embellished.

The transfer or loading of the shirt 402 (or other product) onto the pallet base 202 can include, e.g., insertion of the pallet base 202 into the shirt 402. This can be accomplished by either moving the product loading assembly 122 to insert a stationary pallet base 202 through the bottom opening of the shirt and into the shirt 402 or by moving the pallet base 202 through the bottom opening of a stationary shirt 402, or a combination of both. For example, the product loading assembly 122 can move the shirt 402 into alignment with the pallet base 202, which can then be advanced through the bottom opening to partially or fully insert the pallet base 202 as shown in FIG. 4C.

Figure 4D:
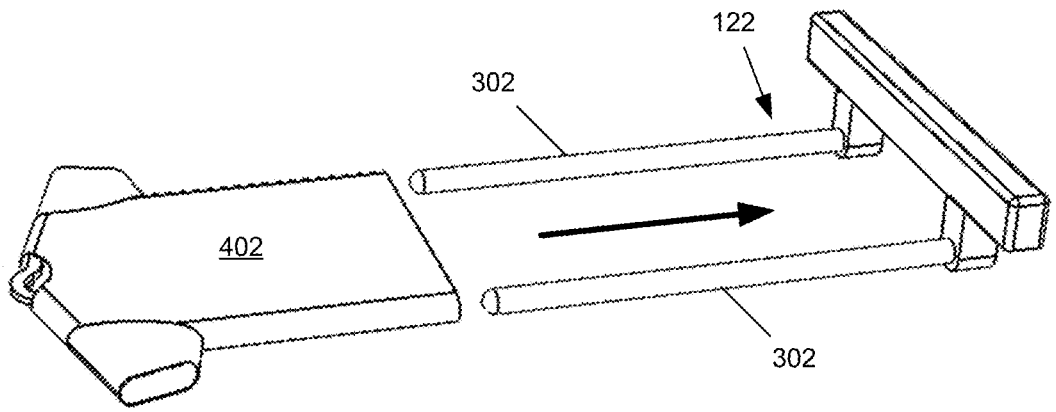

Control of the shirt 402 can then be passed from the pallet loading system 120 to the pallet 132. The pallet 132 can be configured to engage with the shirt 402 to secure its orientation and alignment on the pallet base 202. For example, the product loading assembly 122 can be moved to press the surface 212 of the pallet base 202 against a portion of the inside surface of the shirt 402. The pallet loading system 120 can adjust the orientation and alignment of the garment material over the surface 212. The pallet loading system 120 can tension or spread the garment material over the surface 212 to smooth out the area for embellishment. In some embodiments, the pallet 132 can include grippers that secure the shirt 402 in position on the pallet. The product loading assembly 122 can then be extracted from the shirt 402 as illustrated in FIG. 4D. In some cases, removing the product loading assembly 122 from the shirt 402 can reposition and/or tension the shirt 402 on the pallet base 202.

The area of the garment (or product) to be embellished (e.g., print area) can be smoothed before, during and/or after removal of the product loading assembly 122 from the shirt 402. The shirt 402 on the pallet base 202 can be smoothed on the surface 212 of the pallet 132 during the removal of the product loading assembly 122 or can be smoothed using other means. For example, after loading the shirt 402 over the pallet base 202 (or inserting the pallet base 202 into the shirt 402) the product loading assembly 122 can be lowered onto the surface 212 of the pallet base 202. The material can be smoothed by pulling on the garment (e.g., pulling on the hem of the shirt 402). In some embodiments, the support arm or rod 302 of the product loading assembly 122 can be repositioned in a fashion that stretches the side of the shirt 402 over the surface 212. In other embodiments, air jets, mechanical fingers, or other smoothing device can be used to smooth out the shirt on the surface 212 of the pallet 132 before and/or after extraction of the product loading assembly 122. For example, a mechanical smoothing device can comprise one or more blades, scrapers, brushes, or wipers can be drawn across the material in one or more directions to smooth out the print area.

Figure 4E:
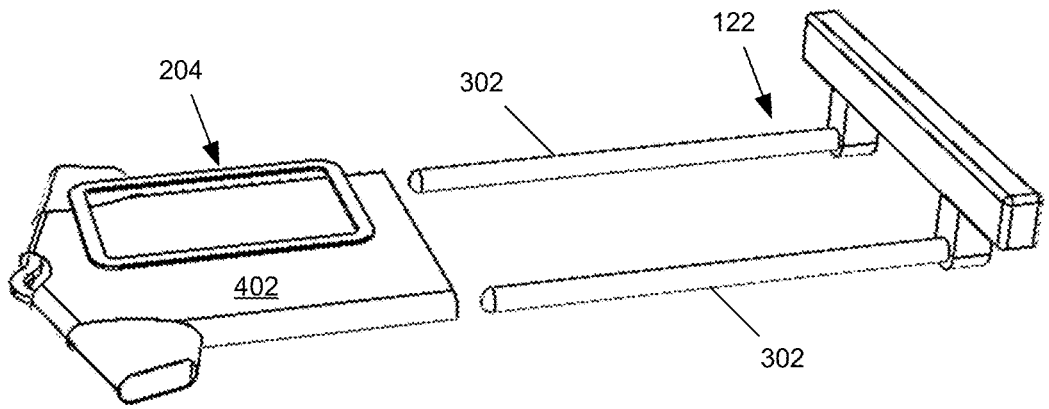
Figure 4F:
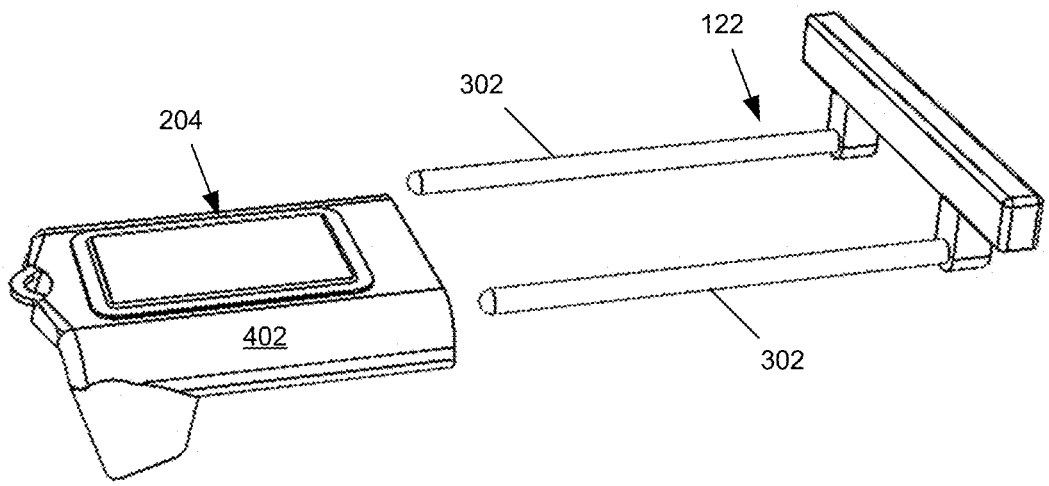

With the garment material positioned and smoothed, a pallet clamp 204 can be lowered over the shirt 402 to secure it around the surface 212 of the pallet base 202 as shown in the FIG. 4E. With the shirt 402 secured on the surface 212 by the pallet clamp 204 as shown in FIG. 4F, the pallet 132 can be positioned in the processing equipment or workstation 130 for embellishment of the shirt 402. In other implementations, the shirt 402 can be secured in position on the surface 212 using, e.g., vacuum suction or other mechanical grippers.

The order of the processing can be varied to address specific processing of the shirt 402 or other products. For example, the pallet 132 could take control of the shirt 402 by using the pallet clamp 204 securing the area to be embellished. Control could be passed as the product loading assembly 122 is removed. For example, if the pallet base 202 is shaped to press against the shoulder of the shirt 402, then the pallet 132 can take control as the product loading assembly 122 slides out of the shirt 402. This motion could also smooth the area to be embellished by stretching the shirt 402 away from the shoulders.

In some implementations, the product loading assembly 122 can become part of the pallet 132 during the embellishment process, and not be removed at all. For example, the support arms or rods 302 (or prongs) can be repositioned into recesses in the pallet base 202 during loading of the shirt 402. In some implementations, the support arms or rods 302 can secure the shirt 402 on the surface 212 of the pallet base 202. This can also assist in automated removal of the shirt 402 after embellishment. In another example, the product loading assembly 122 could be used as the pallet 132 or can include the pallet 132. The securing of the shirt 402 might be achieved as part of the embellishment process, leaving that step out of the loading process. In alternative embodiments, the embellishment process may not require additional securing of the shirt 402.

The shirt 402 (or other garment) can be transferred to the pallet base 202 at various points along the transport path or at the end where the pallet 132 can be installed on the equipment that embellishes the shirt. In other words, the pallet can be installed on the processing equipment or workstation 130 as the shirt 402 is loaded on the pallet base 202. In other embodiments, the pallet 132 can be positioned at an intermediate point along the transport path, where the shirt 402 can be transferred and secured on the pallet base 202 as described. The loaded pallet 132 can then be transported to the processing equipment or workstation 130 for installation and embellishment of the shirt 402. The pallet loading system 120 may be used to transport the pallet loaded with the shirt 402 or control can be transferred to a separate pallet loading system 120 that can move the pallet 132 and shirt 402 to the processing equipment or workstation 130. At that point, the loaded pallet 132 can be automatically or manually installed on the processing equipment or workstation 130 for further processing.

Functioning of the pallet loading system 120 and the pallet loading module 118 of the robotic system 102 will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
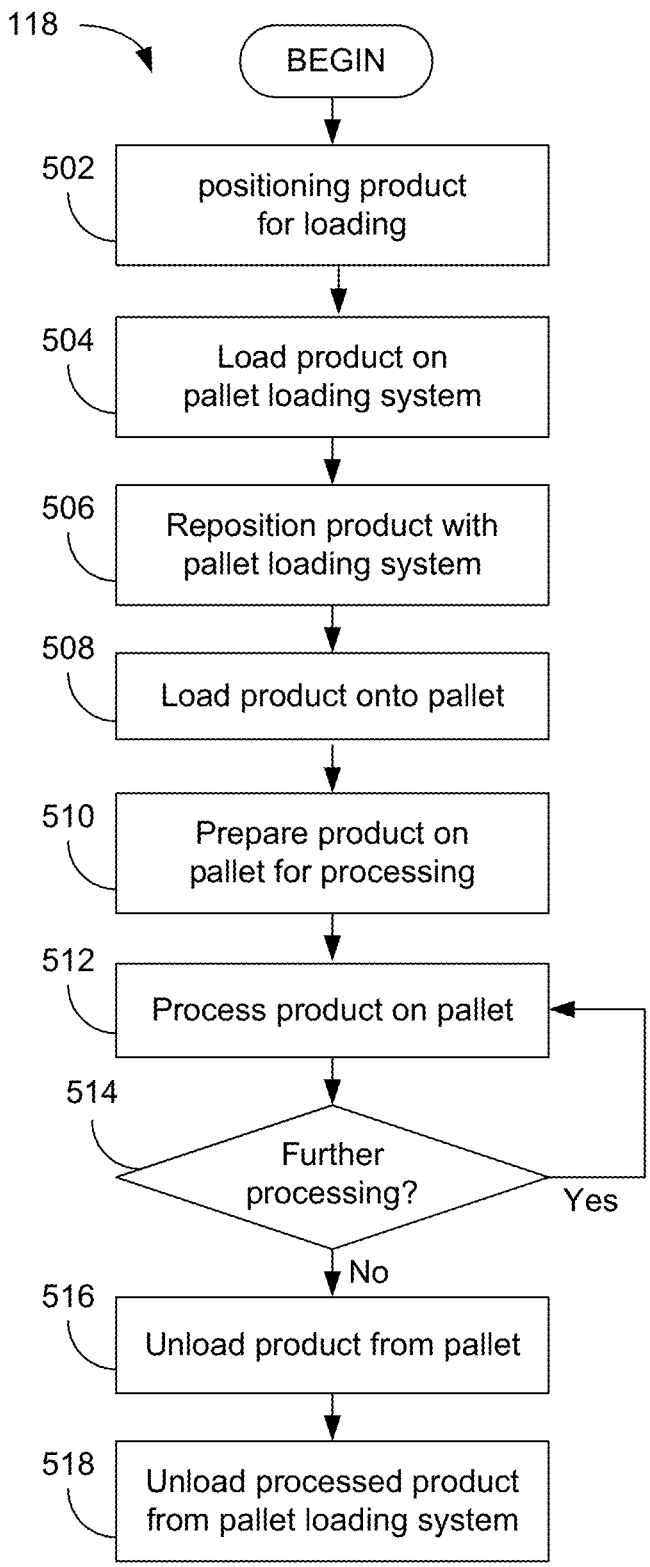
FIG. 5 illustrates an example of a product holding module, according to various embodiments of the present disclosure.

The flow chart of FIG. 5 shows the architecture, functionality, and operation of a possible implementation of the product holding module 118 (FIG. 1). While the discussion with respect to FIG. 5 is in the context of a garment, the described operations are equally applicable to other products (or a portion of a product or garment) that are handled during processing by processing equipment or workstations 130. In addition to garments, products can include other manufactured items such as, but not limited to, pillowcases, covers, bags, etc.

The process can begin at 502 where a garment (e.g., a shirt) or product is positioned for loading by, e.g., a material manipulator. The positioning or manipulation of the garment or other product for loading can be accomplished manually by an operator or user, or can be automated using a material manipulator such as, e.g., an industrial robot with an end effector. The loading of the garment on the support arms or rods 302 can be automatically initiated or can be initiated through an HMI 108 by an operator or user. In some embodiments, pallet loading system can position the product loading assembly 122 horizontally, vertically or in another appropriate orientation with the support arms or rods 302 retracted together to facilitate loading of the garment onto the support arms or rods 302.

In an automated system, the garment or product can be held in a state that allows the pallet loading system 120 to take control of it. In some implementations, product manipulators 150 can assist in manipulating the garment or product to allow the product loading assembly 122 to take control. For example, a product manipulator 150 can grip and lift an edge of the opening of the garment, thereby separating an opening in the garment to allow insertion of the support arms or rods 302 into the garment. At 504, the garment or product is loaded on the pallet loading system 120. In other embodiments, air jets can direct airflow to allow separate the edges of the opening for insertion of support arms or rods 302. After the garment is positioned over the support arms or rods 302, the product loading assembly 122 can expand the support arms or rods 302 away from each other to engage with an inner surface of the garment or product and tension the material for holding the garment or product in position on the support arms or rods 302. Contact control tips of the support arms or rods 302 can be operated to facilitate insertion and increase or maximize contact with the material.

At 506, the garment or product can be repositioned by the pallet loading system 120 to align the garment or product with a pallet 132 (e.g., FIG. 2) of a workstation or other processing equipment 130 (e.g., printing device, heat transfer device, or embroidery device). For example, the product loading assembly 122 can be rotated and/or translated by the support assembly 124, industrial robot, or other support device to align the support arms or rods 302 holding the garment or product with, e.g., a pallet base 202 of the pallet 132. Sensing device(s) 116 or other sensor(s) can be used to align the support arms or rods 302 with the pallet base 202 for loading or transfer of the garment or product at 508 or to detect the garment or product on either the support arms or rods 302 or the pallet 132 of the workstation 130. The garment or product orientation and tension can be adjusted by the pallet loading system 120 to align with and provide clearance for loading over the pallet base 202 of the pallet 132. The pallet loading system 120 can coordinate positioning of the garment for loading.

In some implementations, repositioning the garment or product at 506 can include the pallet loading system 120 transporting the garment or product to a pallet loading location for transfer to the pallet 132 of the processing equipment or workstation 130. At that point, orientation of the garment or product can be controlled by the pallet loading system 120 to facilitate transfer to the pallet 132. For example, the garment or product can be acquired and/or transported by the pallet loading system 120 with the product loading assembly 122 in a first orientation, which can minimize shifting or movement of the garment or product on the support arms or rods 302, and can be repositioned to a second orientation by the pallet loading system 120 at the pallet loading location for loading onto the pallet 132.

With the garment or product oriented or aligned with the pallet base 202, the garment or product can be loaded onto the pallet 132 at 508. The pallet loading system 120 can move the product loading assembly 122 to load the garment or product over and/or around the pallet base 202. The pallet base 202 can be held in a fixed position as the product loading assembly 122 is moved or can simultaneously be advanced through the opening of the garment or product. In some embodiments, the product loading assembly 122 is held in a fixed position and the pallet base 202 is advanced to insert the pallet base 202 into the garment or product.

At 510, the garment or product on the pallet 132 is prepared for processing. The position, orientation or alignment of the garment or product on a surface 212 of the pallet base 202 can be adjusted by the product loading assembly 122. For example, the location of the area of the garment or product to be embellished can be adjusted for proper alignment. In addition, the material can be tensioned or smoothed on the surface 212. The product loading assembly 122 can be removed from the garment or product by the pallet loading system 120 before and/or after positioning, smoothing and/or clamping of the garment or product on the surface 212 during subsequent processing by the workstation 130, or the product loading assembly 122 can remain in the garment or product during the subsequent processing. For example, the garment or product can be smoothed on the pallet base 202 during removal of the product loading assembly 122 from the garment. In other implementations, the garment or product can be smoothed on the surface 212 of the pallet base 202 after removal of the product loading assembly 122 using, e.g., air jets or blades, scrapers, or wipers. In some embodiments, the pallet 132 can be configured to smooth the material using mechanical fingers or other appropriate manipulators. The garment or product can then be secured on the pallet base 202 using, e.g., a pallet clamp 204 or other appropriate fastening assembly. The pallet clamp 204 can hold and tension the material over the surface 212 for embellishment or other processing by the workstation 130.

The garment or product can then be processed at 512 by the processing equipment or workstation 130. For example, the garment or product can be embellished with a design by printing, heat transfer, embossing, embroidery, or other embellishment. If further processing is needed at 514, then processing can continue at 512. For example, embellishment of the garment or product may need multiple layers or coatings to be applied. The pallet 132 can be repositioned by the processing equipment or workstation 130 as needed to achieve the desired result. In some cases, the pallet 132 may transport the garment or product between different locations for processing by the processing equipment or workstation 130. If processing is complete at 514, the pallet 132 can be repositioned and the material released from the pallet base 202 for removal of the garment or product.

At 516, the pallet loading system 120 can be adjusted to remove the processed garment or product from the pallet 132. The product loading assembly 122 can be advanced and the support arms or rods 302 repositioned to align with the opening of the garment or product. The adjustment can ensure clearance between the support arms or rods 302 and the pallet 132 of the workstation 130 before inserting the support arms or rods 302 into the garment or garment opening. Contact control tips of the support arms or rods 302 can also be adjusted to facilitate insertion into the garment. After insertion, the support arms or rods 302 can be expanded to contact and tension the material of the garment. The support arms or rods 302 can be expanded sufficiently to disengage the garment from the pallet base 202 for unloading. Sensing device(s) 116 or sensor(s) can be used to align the support arms or rods 302 with the pallet 132 for unloading of the garment or to detect the garment on either the support arms or rods 302 or the pallet 132 of workstation 130. The support assembly 124 can then retract the product loading assembly 122 to unload the garment from the pallet at 516.

The processed garment or product can then be unloaded from the pallet loading system 120 at 518. The pallet loading system 120 can transport the garment or product to an unloading area for removal from the product loading assembly 122. For example, the support assembly 124 can autonomously transport the garment on the product holding assembly 122 or an operator or user can manually move the material product holding system 120. Unloading of the garment or other product from the support arms or rods 302 of the product loading assembly 122 can be accomplished manually by an operator or user, or can be automated using, e.g., an industrial robot with an end effector. The pallet loading system 120 can then return to 504, where the pallet loading system 120 can adjust the support arms or rods 302 for alignment of another garment or product.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about y".

The invention claimed is:

1. A method for automated product loading, comprising:
positioning, by a material manipulator, an existing opening of a product for insertion of a product loading assembly;
inserting the product loading assembly of a pallet loading system through the existing opening of the product, the product loading assembly configured to hold the product during manipulation of the product, the pallet loading system configured to position the product for loading on a pallet; and
transferring the product onto the pallet using the product loading assembly.

2. The method of claim 1, wherein positioning the existing opening comprises lifting, by the material manipulator, an edge of the existing opening of the product for the insertion of the product loading assembly.

3. The method of claim 2, wherein the material manipulator is configured to separate and grip an end of the existing opening of the product.

4. The method of claim 3, wherein air dispensed by the material manipulator separates the edge of the existing opening for gripping by mechanical fingers.

5. The method of claim 1, wherein the product loading assembly engages with an inner surface of the product to hold the product during manipulation.

6. The method of claim 5, wherein the product loading assembly comprises support arms that are inserted through the existing opening and expand to engage with the inner surface of the product.

7. The method of claim 1, comprising transporting the product with the pallet loading system to a pallet loading location for transfer of the product to the pallet.

8. The method of claim 7, wherein orientation of the product is controlled by the pallet loading system for transfer to the pallet.

9. The method of claim 8, wherein the product loading assembly acquires the product in a first orientation and is repositioned to a second orientation by the pallet loading system at the pallet loading location.

10. The method of claim 1, wherein transferring the product onto the pallet comprises relative motion between the product loading assembly and a pallet base to insert the pallet base of the pallet through the existing opening of the product.

11. The method of claim 10, wherein transferring the product onto the pallet comprises advancing the pallet base through the existing opening of the product.

12. The method of claim 10, wherein position of the product on the pallet base is adjusted by the product loading assembly.

13. The method of claim 12, wherein the position of the product is adjusted by support rods of the product loading assembly.

14. The method of claim 1, comprising smoothing the product on the pallet.

15. The method of claim 14, wherein the product is smoothed during removal of the product loading assembly from the product.

16. The method of claim 14, wherein the product is smoothed on the pallet by support arms of the product loading assembly.

17. The method of claim 14, wherein the product is smoothed on the pallet after removal of the product loading assembly from the product.

18. The method of claim 14, wherein the product is smoothed on the pallet by a mechanical smoothing device.

19. The method of claim 14, comprising securing the product on the pallet.

20. The method of claim 19, wherein the product is secured on a raised surface of the pallet by a pallet clamp.

* * * * *